(12) United States Patent
Omae et al.

(10) Patent No.: US 9,276,461 B2
(45) Date of Patent: Mar. 1, 2016

(54) ELECTRIC POWER STEERING DRIVING APPARATUS

(75) Inventors: Katsuhiko Omae, Chiyoda-ku (JP); Kohei Ushio, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 15 days.

(21) Appl. No.: 14/350,283

(22) PCT Filed: Mar. 6, 2012

(86) PCT No.: PCT/JP2012/055623
§ 371 (c)(1),
(2), (4) Date: Apr. 7, 2014

(87) PCT Pub. No.: WO2013/132584
PCT Pub. Date: Sep. 12, 2013

(65) Prior Publication Data
US 2014/0300304 A1    Oct. 9, 2014

(51) Int. Cl.
*H02H 7/09* (2006.01)
*H02M 1/44* (2007.01)
*B62D 5/04* (2006.01)
*H02K 11/00* (2006.01)
*H02K 11/02* (2006.01)
(Continued)

(52) U.S. Cl.
CPC ............ *H02M 1/44* (2013.01); *B62D 5/0406* (2013.01); *B62D 5/046* (2013.01); *H02K 11/0073* (2013.01); *H02K 11/024* (2013.01); *H02P 31/00* (2013.01); *H02K 7/1166* (2013.01)

(58) Field of Classification Search
CPC .................................. H02P 6/002; H02H 6/14
USPC ..................................................... 318/400.22
See application file for complete search history.

(56) References Cited

U.S. PATENT DOCUMENTS

| 6,107,767 A * | 8/2000 | Lu et al. ........................ 318/561 |
| 2006/0232235 A1* | 10/2006 | Iwazawa ........................ 318/376 |
| 2008/0234897 A1* | 9/2008 | Tsuchida ........................ 701/42 |

(Continued)

FOREIGN PATENT DOCUMENTS

| JP | 2000-166254 A | 6/2000 |
| JP | 2007-002652 A | 1/2007 |

(Continued)

OTHER PUBLICATIONS

International Search Report of PCT/JP2012/055623 filed May 15, 2012.

(Continued)

*Primary Examiner* — Erick Glass
(74) *Attorney, Agent, or Firm* — Sughrue Mion, PLLC; Richard C. Turner

(57) ABSTRACT

In an electric power steering driving unit provided with an electric motor that outputs auxiliary torque to a handwheel of a vehicle, a control apparatus having semiconductor switching devices that each control a current to the electric motor, and a noise filter that prevents noise, produced when the semiconductor switching devices each control a current to the electric motor, from being emitted, the noise filter is configured with a plurality of coils, capacitors that make pairs with the respective corresponding coils, and a bus bar that performs connections among the coils and the capacitors, and part of or all of the noise filter is configured as a structural member that is different from the control apparatus.

12 Claims, 5 Drawing Sheets

(51) Int. Cl.
*H02P 31/00* (2006.01)
*H02K 7/116* (2006.01)

(56) References Cited

U.S. PATENT DOCUMENTS

| | | |
|---|---|---|
| 2008/0236964 A1 | 10/2008 | Kikuchi et al. |
| 2011/0018374 A1 | 1/2011 | Yamasaki et al. |
| 2011/0156626 A1* | 6/2011 | Mukai et al. .............. 318/400.21 |
| 2011/0285336 A1 | 11/2011 | Fujita et al. |
| 2011/0291501 A1 | 12/2011 | Watanabe et al. |
| 2012/0098361 A1 | 4/2012 | Yamasaki et al. |
| 2012/0098365 A1 | 4/2012 | Yamasaki et al. |
| 2012/0098366 A1 | 4/2012 | Yamasaki et al. |
| 2012/0098391 A1 | 4/2012 | Yamasaki et al. |
| 2012/0104886 A1 | 5/2012 | Yamasaki et al. |
| 2012/0313467 A1 | 12/2012 | Omae et al. |

FOREIGN PATENT DOCUMENTS

| | | |
|---|---|---|
| JP | 2008-078844 A | 4/2008 |
| JP | 2008-182784 A | 8/2008 |
| JP | 2008-238987 A | 10/2008 |
| JP | 2009-094185 A | 4/2009 |
| JP | 2010-084669 A | 4/2010 |
| JP | 2011-032893 A | 2/2011 |
| JP | 2011-239574 A | 11/2011 |
| JP | 2011-250490 A | 12/2011 |
| WO | 2010/150527 A1 | 12/2010 |

OTHER PUBLICATIONS

Communication dated Sep. 2, 2014, issued by the Japanese Patent Office in counterpart Application No. 2014503313.

* cited by examiner

ELECTRIC POWER STEERING DRIVING APPARATUS

CROSS REFERENCE TO RELATED APPLICATIONS

This is a National Stage of International Application No. PCT/JP2012/055623 filed Mar. 6, 2012, the contents of of which are incorporated herein by reference in its entirety.

TECHNICAL FIELD

The present invention relates to an electric power steering driving unit that provides assist force to the steering system of a vehicle by means of, for example, torque of an electric motor, and particularly to an electric power steering driving unit in which a noise filter is integrally contained.

BACKGROUND ART

To date, there has been known an electric power steering driving unit that is provided with an electric motor that outputs auxiliary torque to the handwheel of a vehicle and a control apparatus that performs driving control of the electric motor and in which the control apparatus is mounted in the electric motor. In general, as the method of driving the electric motor, a PWM method is utilized; the PWM method is realized by pulse-driving the electric motor by use of a semiconductor switching device. In the case where a large current is controlled by the semiconductor switching device, a great deal of EMI noise occurs, as an adverse effect thereof. Accordingly, in order to prevent the noise from being emitted to the outside of the apparatus, a noise filter is incorporated in the control apparatus (e.g., refer to Patent Document 1).

As far as the motor driving apparatus disclosed in Patent Document 1 is concerned, there has been proposed a motor driving apparatus in which an integrated power module is formed of a plurality of switching devices so that it can be utilized for various kinds of motors such as a brush motor and a three-phase brushless motor.

The motor driving apparatus disclosed in Patent Document 1 has a structure in which a plurality of switching devices for controlling the electric power of an electric motor are integrated into a module and this power module is mounted on a heat sink and in which a control board 33 on which small-current devices such as a microcomputer and the like are mounted is incorporated and a control unit drives the power module. The motor drive apparatus incorporates a choke coil inside the heat sink on which the power module is mounted, so that an EMI noise filter for preventing the EMI noise from leaking out of the power supply line is configured. Patent Document 1 does not describe the detail of the configuration of the filter; however, it is conceivable that a normal mode filter or a common mode filter is anticipated.

PRIOR ART REFERENCE

Patent Document

[Patent Document 1] International Publication No. 2010/150527

DISCLOSURE OF THE INVENTION

Problems to be Solved by the Invention

However, in the motor drive apparatus disclosed in Patent Document 1, the positioning of the choke coil included in the EMI noise filter is restricted by the sizes or the shapes of the peripheral power module and the heat sink; therefore, the degree of freedom in designing the filter in an optimal manner in accordance with the demanded performance is deteriorated.

Furthermore, in many cases, a normal mode filter and a common mode filter are concurrently utilized in general, in order to raise the performance of the EMI noise filter; at least two coils are required for each of the filters. Because in the motor driving apparatus disclosed in Patent Document 1, no space for containing two or more coils is provided, there is posed a problem that there exists no flexibility in design.

The present invention has been implemented in order to solve the foregoing problem; the objective thereof is to provide an electric power steering driving unit in which a noise filter is configured in an optimal manner.

Means for Solving the Problems

An electric power steering driving unit according to the present invention is provided with an electric motor that outputs auxiliary torque to a handwheel of a vehicle, a control apparatus having semiconductor switching devices that each control a current to the electric motor, and a noise filter that prevents noise, produced when the semiconductor switching devices each control a current to the electric motor, from being emitted; the electric power steering driving unit is characterized in that the noise filter is configured with a plurality of coils, capacitors that make pairs with the respective corresponding coils, and a wiring material that performs connections among the coils and the capacitors and in that part of or all of the noise filter is configured as a structural member that is different from the control apparatus.

Advantage of the Invention

In an electric power steering driving unit according to the present invention, a structural member included in a noise filter is disposed separately from other constituent members; thus, the flexibility in designing for realizing an appropriate performance in accordance with a required one is raised, an optimum and a high-performance noise filter can be configured, and it is made possible to cope with the required performance with a minimally necessary structural change.

Objectives, features, aspects, and advantages other than the foregoing objective of the present invention will become more apparent from the following detailed description of the present invention when taken in conjunction with the accompanying drawings.

BEST MODE FOR CARRYING OUT THE INVENTION

Figure 1:
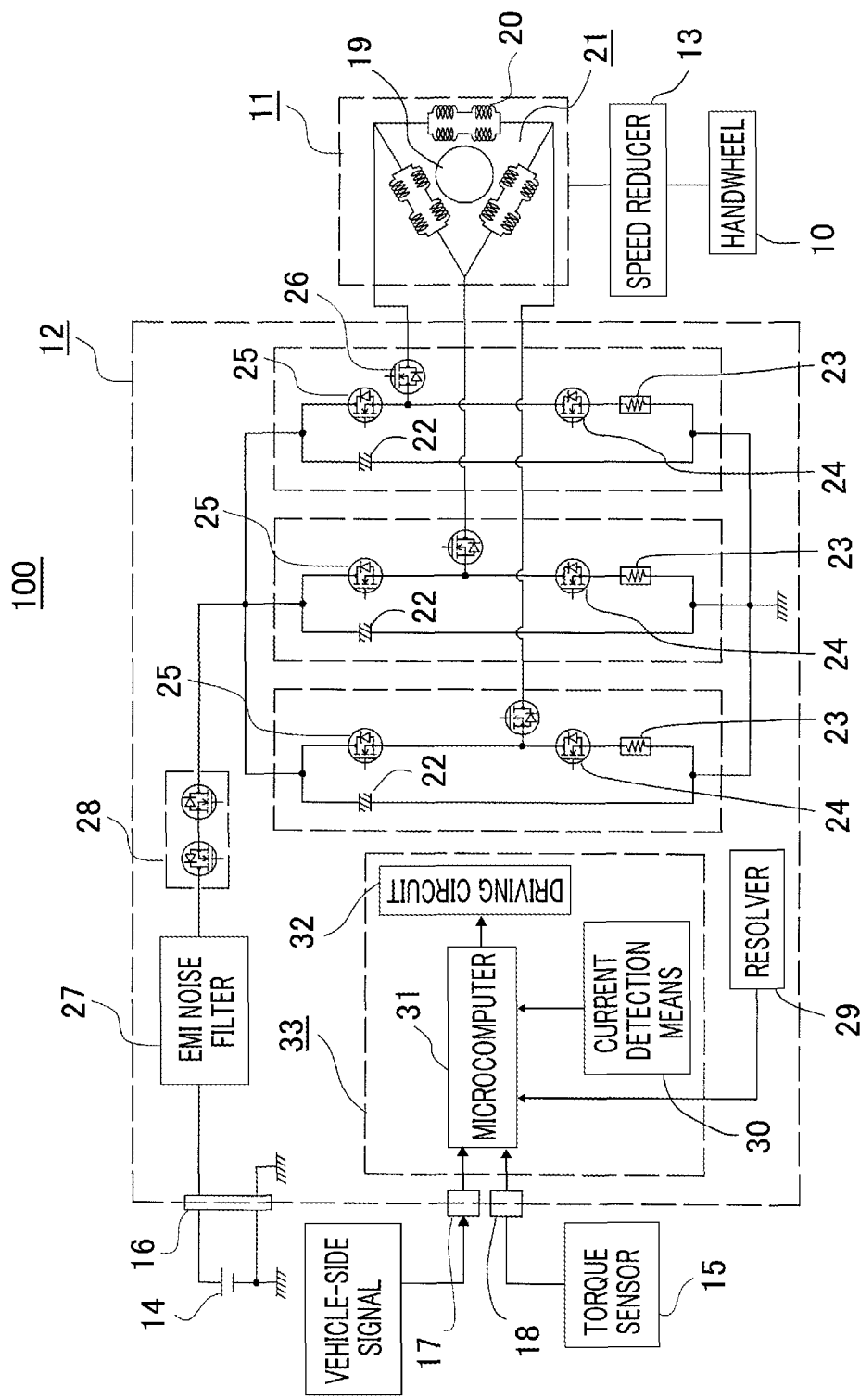
FIG. 1 is a block circuit diagram representing the circuit configuration of an electric power steering apparatus according to Embodiment 1 of the present invention.

Hereinafter, preferred embodiments of an electric power steering driving unit according to the present invention will be explained with reference to the drawings. The explanation will be made with reference to the drawings, in each of which the same or similar constituent members and elements are designated by the same reference numerals.

Embodiment 1

FIG. 1 is a block circuit diagram representing the circuit configuration of an electric power steering apparatus according to Embodiment 1 of the present invention.

A driving apparatus 100 is provided with an electric motor 11 that outputs auxiliary torque to a handwheel 10 of a vehicle, a control apparatus 12 that performs driving control of the electric motor 11, a speed reducer 13 that reduces the rotation speed of the electric motor 11, a battery 14 that supplies an electric current for driving the electric motor 11, and a torque sensor 15 that detects the steering torque of the handwheel 10.

Moreover, the driving apparatus 100 is provided with a power source connecter 16 that electrically connects the battery with the control apparatus 12, a vehicle-side-signal connecter 17 to which vehicle-side-signals such as a vehicle speed signal and the like are inputted from the vehicle, and a torque-sensor connector 18 that electrically connects the torque sensor 15 with the control apparatus 12. The electric motor 11 is a three-phase brushless motor and is provided with a rotor 19 and a stator 21 having a U-phase, a V-phase, and a W-phase armature winding 20.

The control apparatus 12 is provided with large-capacity condensers 22 (approximately 2200 μF×3) that each absorb ripple components of a motor current IM flowing in the electric motor 11; shunt resistors 23 that each detect the motor current IM; power switching devices 24 and power switching devices 25 included in a three-phase bridge circuit that switches motor currents IM in accordance with the intensity and the direction of the auxiliary torque; motor-relay switching devices 26, each formed of, for example, an FET, that are each inserted into a corresponding-phase power supply line between the electric motor 11 and each of the plurality of power switching devices 24 and 25 included in the bridge circuit; an EMI noise filter 27 that prevents electromagnetic noise, generated when the semiconductor switching devices 24 and 25 each operate, from leaking toward the outside and becoming radio noise; and a relay circuit 28 that is a switching means for passing or cutting off a battery current that is supplied from the battery 14 to the bridge circuit.

Moreover, the control apparatus 12 is provided with a resolver 29, which is a rotation position sensor that detects the rotation position of the rotor 19; a current detection means 30 that is connected with the shunt resistor 23 and detects a current flowing in the electric motor 11; a microcomputer 31 that calculates auxiliary torque, based on a steering torque signal from the torque sensor 15, and feeds back the motor current detected by the current detection means 30 and the rotation position of the rotor 19 detected by the resolver 29 so as to calculate a current corresponding to the auxiliary torque;

a driving circuit 32 that outputs a drive signal for controlling the operations of the power switching devices 24 and 25, in accordance with a command from the microcomputer 31; and a control board 33 on which the current detection means 30, the microcomputer 31, and the driving circuit 32 are mounted.

The microcomputer 31 includes a well-known a self-diagnosis function in addition to an A/D converter, a PWM timer circuit, and the like so as to constantly self-diagnoses whether or not the system is operating normally; when an abnormality occurs, the microcomputer 31 cuts off the motor current IM. The microcomputer 31 receives steering torque information from the torque sensor 15, information, from the resolver 29, on the rotation position of the rotor 19 of the electric motor 11; the microcomputer 31 also receives the traveling speed signal, as one of the vehicle-side-signals, from the vehicle-side-signal connecter 17.

Moreover, the microcomputer 31 receives the motor current IM detected by the shunt resistor 23, by way of the current detection means 30. Based on these information items and signals, the microcomputer 31 creates a rotation direction command for power steering and a current control value corresponding to the auxiliary torque and then inputs the respective driving signals to the driving circuit 32.

When receiving the rotation direction command and the current control value, the driving circuit 32 creates PWM driving signals and applies them to the power switching devices 24 and 25. As a result, a current from the battery 14 flows into the electric motor 11, by way of the power source connecter 16, the noise filter 27, the power switching devices 24 and 25, and the motor-relay switching devices 26; then, required auxiliary torque is outputted in a required direction.

In this situation, the motor current detected by the shunt resistor 23 and the current detection means 30 is fed back to the microcomputer 31; control is performed so that the motor current coincides with a motor current command that is transmitted from the microcomputer 31 to the driving circuit 32. The motor current includes ripple components generated through the switching operation at a time when the power switching devices 24 and 25 are PWM-driven; however, the ripple components are smoothed and controlled.

Figure 2:
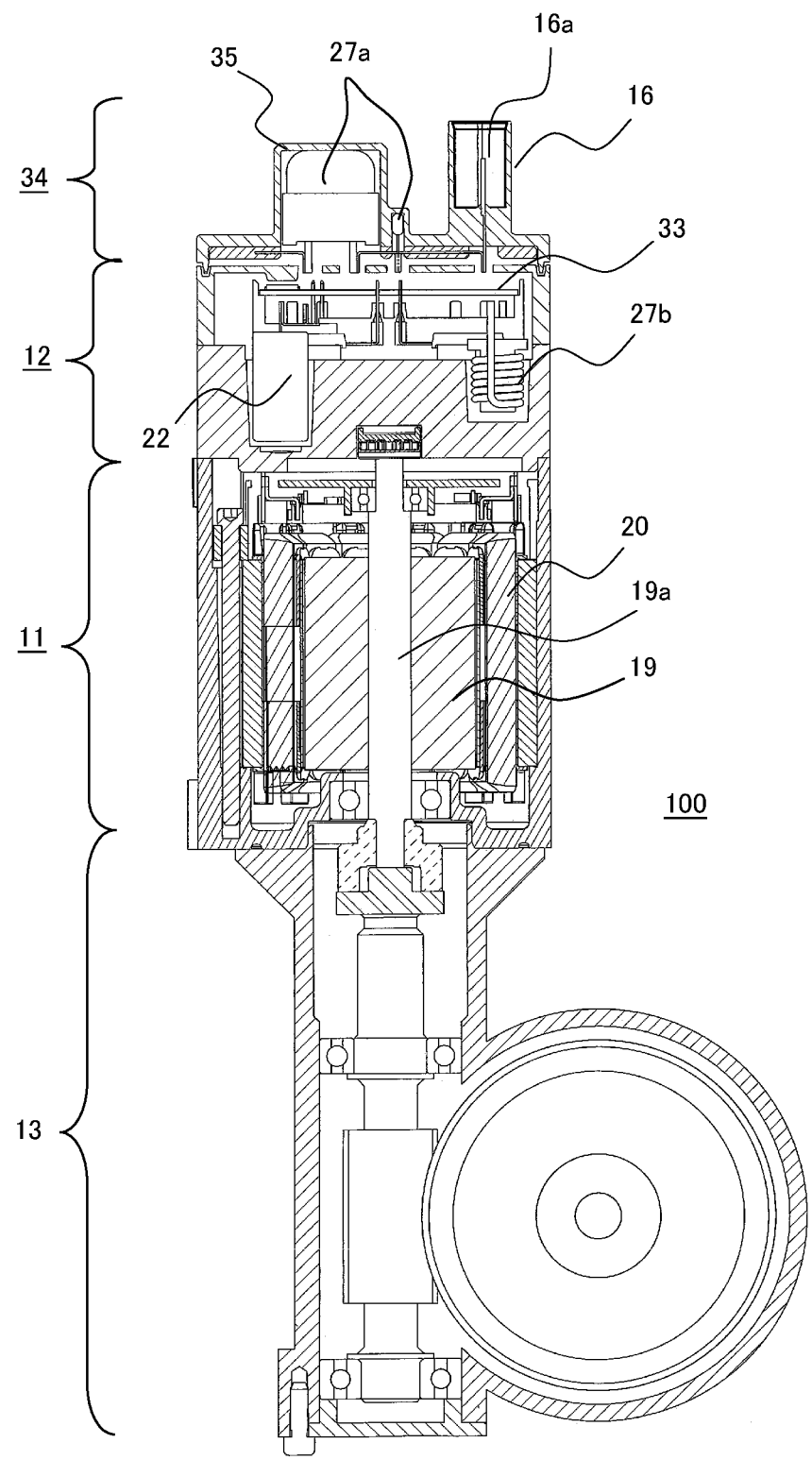
FIG. 2 is an overall configuration diagram of the electric power steering apparatus according to Embodiment 1 of the present invention.
Figure 3:
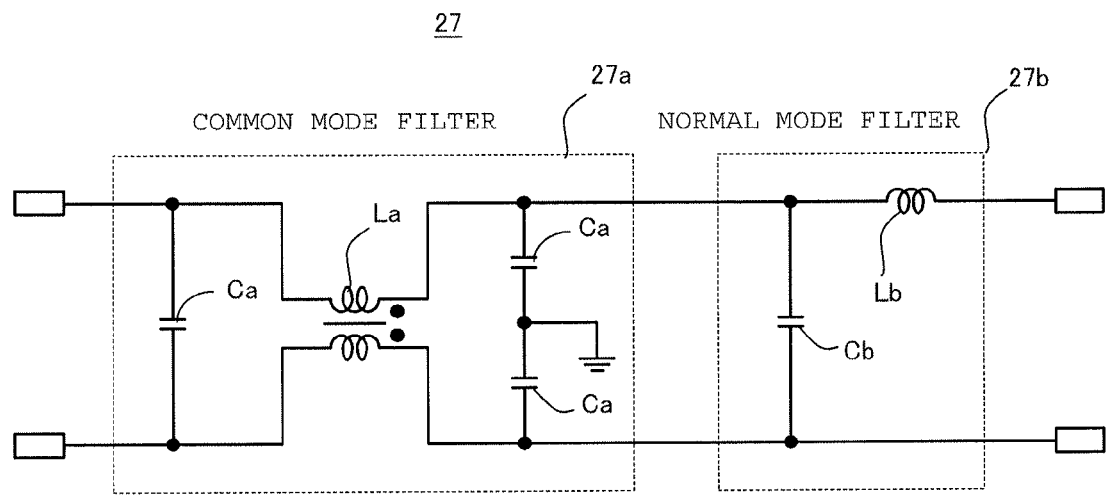
FIG. 3 is a diagram representing an example of circuit configuration of an EMI filter in the electric power steering apparatus according to Embodiment 1 of the present invention.

Next, the structure of the electric power steering driving unit will be explained with reference to FIG. 2. FIG. 2 is a cross-sectional view of the electric power steering driving unit; reference numeral 34 denotes a structural member provided with a first noise filter 27a; reference character 27b denotes a second noise filter contained in the control apparatus 12. The first noise filter and the second noise filter are electrically connected with each other so that the performance, explained with reference to FIG. 1, of the noise filter is ensured; after the first noise filter has been provided in the structural member 34, the structural member 34 is integrated with the control apparatus 12.

The speed reducer 13, the electric motor 11, the control apparatus 12, and the structural member 34 are arranged in a direction coaxial with the rotor shaft 19a of the electric motor 11 and are integrated with one another. In this example, the control apparatus 12 is disposed after the electric motor 11 (at the side opposed to the speed reducer 13), and the structural member 34 is disposed after the control apparatus 12; however, it may be allowed that the control apparatus 12 is disposed before the electric motor 11 (at the same side as the speed reducer 13) and the structural member 34 is disposed after the electric motor 11). This configuration can eliminate the radial protrusion; thus, the mountability of the electric power steering driving unit in the rack unit or the like in the engine room of a vehicle is raised. Reference character 16a denotes a power source terminal of the power source connecter 16; reference numeral 35 denotes a resin case that holds the constituent members of the structural member 34 and covers the whole apparatus.

Based on the block circuit configuration represented in FIG. 1, the electric power steering driving unit 100 is configured as illustrated in FIG. 2. In general, as far as the configuration of the noise filter 27 is concerned, the design therefor is implemented in such a way that a predetermined performance is obtained by concurrently utilizing a normal mode filter and a common mode filter; in Embodiment 1, as the first noise filter 27a, a common mode filter is configured in the structural member 34, and, as the second noise filter 27b, a normal mode filter is configured in the control apparatus 12 The first noise filter 27a configured in the structural member 34 makes it possible to readily cope with a required performance without providing any effect to other structural portions, by performing a design change only in this portion in accordance with the required performance.

The first noise filter 27a to be provided in the structural member 34 may be a normal mode filter; alternatively, both a normal mode filter and a common mode filter may concurrently be provided in the structural member 34, except the second noise filter 27b in the control apparatus 12. The designing can flexibly be performed in accordance with a required specification.

Next, the configuration of the first noise filter 27a provided in the structural member 34 will be explained in detail, with reference to FIGS. 2 through 5.

Figure 4:
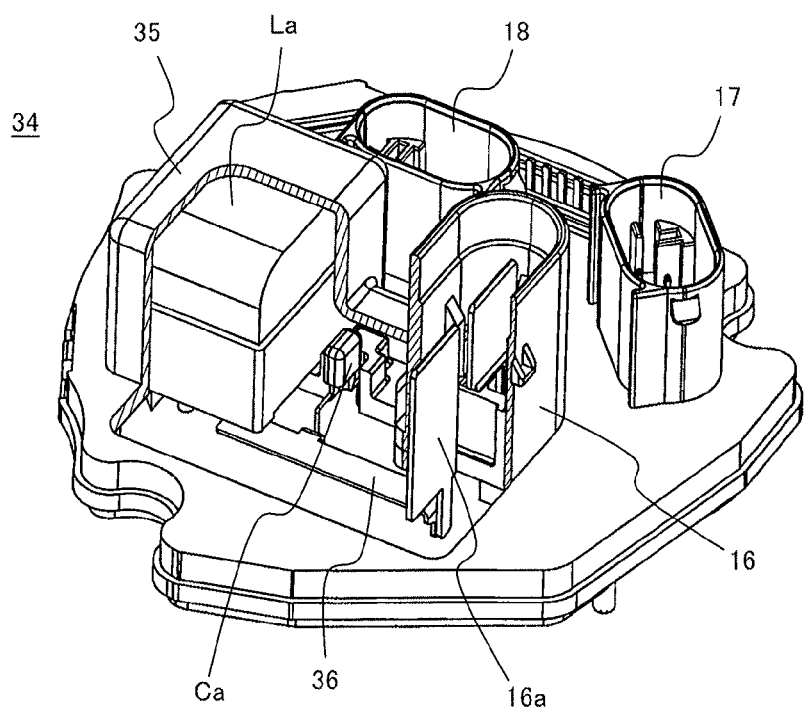
FIG. 4 is a view illustrating a structural member included in the EMI filter of the electric power steering apparatus according to Embodiment 1 of the present invention.

In the control apparatus 12, for example, a normal mode coil Lb and a capacitor Cb with which the normal mode filter 27b is configured are integrated. In contrast, the common mode filter 27a is configured through the combination of the common mode coil La and a capacitor Ca; as illustrated in FIG. 4, the common mode filter 27a is provided not in the control apparatus 12 but in the structural member 34. In FIG. 4, some members included in the common mode filter 27a are not illustrated.

The members included in the common mode filter 27a are connected with one another by welding or soldering, through the intermediary of a bus bar 36, which is a wiring material. The bus bar 36 is utilized also as a power source terminal and as the power source terminal 16a of the power source connecter 16. This configuration makes it possible not only to save the power source connecter 16 and the materials for connecting the members included in the common mode filter 27a but also to reduce the number of connection points among the members; thus, the processing costs can be reduced.

In Embodiment 1, there has been described an example where the normal mode filter 27b is disposed in the control apparatus 12 and the common mode filter 24a is disposed not in the control apparatus 12 but in the structural member 34; however, as described above, both of them or either one of them may be disposed in the structural member 34.

Figure 5:
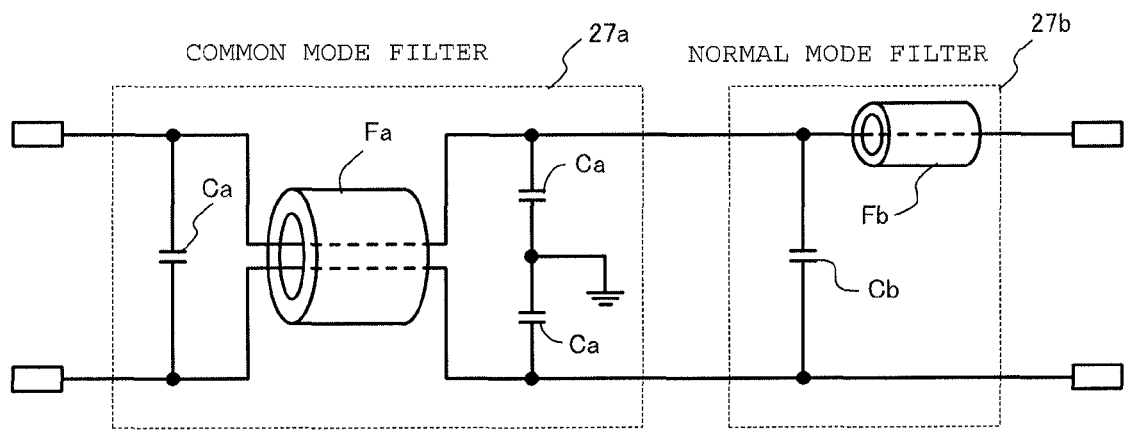
FIG. 5 is a diagram representing another example of circuit configuration of the EMI filter in the electric power steering apparatus according to Embodiment 1 of the present invention.

FIG. 5 is an example where the common mode coil La and the normal mode coil Lb are replaced by ferrite beads Fa and Fb, respectively. With regard to the ferrite beads Fa and Fb, contrivance is made in such a way that the materials therefor each convert noise into heat, thereby absorbing the noise; because being superior in terms of high-frequency characteristics, each of the ferrite beads Fa and Fb is effective when a noise filter covering the frequency band higher than the FM radio band (higher than 80 MHz) is configured. The bus bar 36 penetrates the ferrite beads Fa and Fb, so that a noise filter having superior high-frequency characteristics can readily be realized. FIG. 5 illustrates an example in which the ferrite beads Fa and Fb are utilized; however, the coil-type common mode and normal mode coils La and Lb illustrated in FIG. 3 and the ferrite beads Fa and Fb may concurrently be utilized.

As explained heretofore, in the electric power steering driving unit according to Embodiment 1, part of or all of the noise filter is provided not in the control apparatus 12 but in the structural member 34, so that the flexibility in designing is raised, the appropriate designing can be implemented, and downsizing and cost saving can be achieved.

The structural member 34 included in the noise filter has the bus bar 36 that functions as a power source terminal; integration of the wiring leads among the filter members makes it possible to rationalize the wiring; thus, the reduction of the number of materials at connection portions and the reduction of the number of connection processes can achieve the cost saving.

Similarly, integration of the bus bar 36 with the connector electrode 16a makes it possible to rationalize the wiring; thus, the reduction of the number of materials at connection portions and the reduction of the number of connection processes can achieve the cost saving.

A filter is configured with the ferrite beads Fa and Fb and the bus bar 36 instead of the common mode coil La and the normal mode coil Lb; thus, a noise filter having superior high-frequency characteristics can be obtained and hence the performance thereof is raised.

In Embodiment 1, the members included in the common mode filter 27a are contained not in the control apparatus 12 but in the structural member 34; the structural member 34 holds the members with the resin case 35 and the whole structural member 34 is covered with the resin case 35. This structure makes it possible to raise the vibration-resistance.

Although unillustrated, when the structural member 34 included in the common mode filter 27a is covered with a conductive metal, there is demonstrated an effect of electrostatic shield; thus, the performance of the noise filter can be enhanced.

Similarly, when the structural member 34 included in the common mode filter 27a is covered with a magnetic metal, there is demonstrated an effect of magnetic shield; thus, the performance of the noise filter can be enhanced.

Embodiment 2

Figure 6:
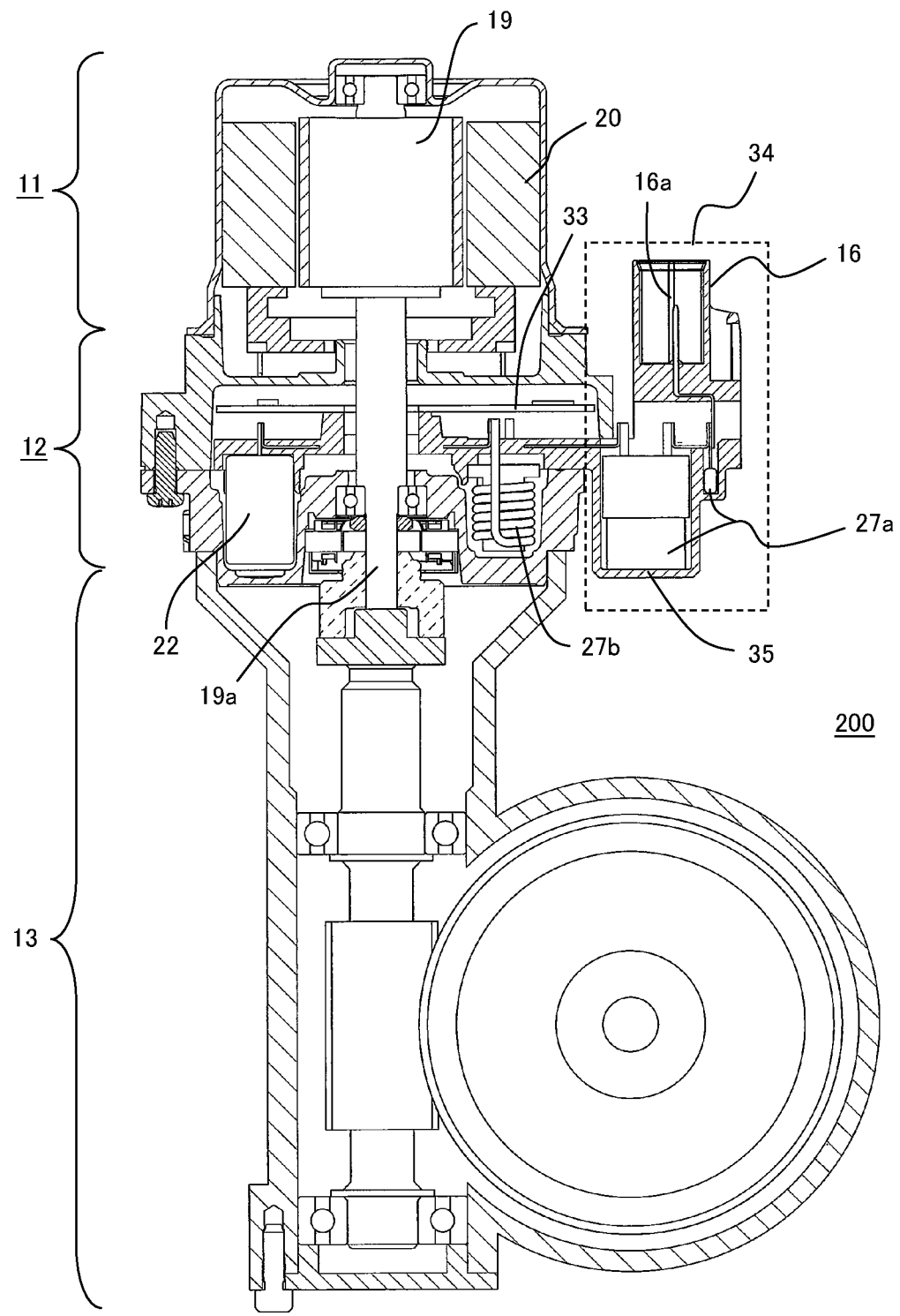
FIG. 6 is an overall configuration diagram of an electric power steering apparatus according to Embodiment 2 of the present invention.

Next, an electric power steering driving unit according to Embodiment 2 of the present invention will be explained. FIG. 6 illustrates an electric power steering driving unit 200 according to Embodiment 2; FIG. 6 corresponds to FIG. 2 of Embodiment 1.

In the electric power steering driving unit 200, the control apparatus 12 is disposed before the electric motor 11 (at the same side as the speed reducer 13) and in a direction coaxial with the rotor shaft 19a of the electric motor 11, and the structural member 34 is disposed at the side (in the radial direction) of the control apparatus 12.

In this configuration, the structural member 34 protrudes in the radial direction of the shaft; however, the overall length thereof in the axis direction can be reduced, and hence, for example, the mountability, especially in the vehicle column unit or the like, is raised.

Heretofore, Embodiments 1 and 2 of the present invention have been explained; however, the present invention is not limited to these Embodiments, and in the scope of the present invention, the embodiments thereof can freely be combined with one another and can appropriately be modified or omitted.

The invention claimed is:

1. An electric power steering driving unit comprising:
an electric motor that outputs auxiliary torque to a handwheel of a vehicle;

a control apparatus having semiconductor switching devices that each control a current to the electric motor; and a noise filter that prevents noise, produced when the semiconductor switching devices each control a current to the electric motor, from being emitted, wherein the noise filter is configured with a plurality of coils, capacitors that make pairs with the respective corresponding coils, and a wiring material that performs connections among the coils and the capacitors, a structure member into which all or part of said noise filter is configured;

wherein said structure member being physically separated from the control apparatus.

2. The electric power steering driving unit according to claim 1, wherein the wiring material is a bus bar that functions also as a power source terminal of the electric power steering driving unit.

3. The electric power steering driving unit according to claim 1, wherein the wiring material functions also as a power source connecter of the control apparatus.

4. The electric power steering driving unit according to claim 1, wherein the noise filter is configured with a normal mode filter including a normal mode coil and a capacitor accompanying the coil and a common mode filter including a common mode coil and a capacitor accompanying the coil, and wherein the structural member includes any one of or both the normal mode filter and the common mode filter.

5. The electric power steering driving unit according to claim 1, wherein the noise filter is configured with a normal mode filter including a ferrite beads and a capacitor accompanying the ferrite beads and a common mode filter including a ferrite beads and a capacitor accompanying the ferrite beads, and wherein the structural member includes any one of or both the normal mode filter and the common mode filter.

6. The electric power steering driving unit according to claim 1, wherein the noise filter is configured with a normal mode filter including a ferrite beads, a normal mode coil, and a capacitor accompanying the ferrite beads and the normal mode coil and a common mode filter including a ferrite beads, a common mode coil, and a capacitor accompanying the ferrite beads and the common mode coil, and wherein the structural member includes any one of or both the normal mode filter and the common mode filter.

7. The electric power steering driving unit according to claim 1, wherein the structural member includes a resin case that holds and covers constituent members of the filter.

8. The electric power steering driving unit according to claim 7, further including a conductive metal that covers the resin case.

9. The electric power steering driving unit according to claim 7, further including a magnetic metal that covers the resin case.

10. The electric power steering driving unit according to claim 1, wherein the electric motor, the control apparatus, and the structural member are arranged in the rotor shaft direction of the electric motor in such a way that the electric motor, the control apparatus, and the structural member are situated in that order or in such a way that the control apparatus, the electric motor, and the structural member are situated in that order.

11. The electric power steering driving unit according to claim 1, wherein the electric motor and the control apparatus are arranged in the rotor shaft direction of the electric motor and the structural member is disposed on the control apparatus in a direction that is perpendicular to the rotor shaft direction.

12. The electric power steering driving unit according to claim 1, wherein the noise filter includes a first noise filter and a second noise filter, the structure member includes the first noise filter, and the control apparatus includes the second noise filter.

* * * * *